United States Patent [19]
Garber et al.

[11] Patent Number: 6,089,144
[45] Date of Patent: Jul. 18, 2000

[54] HOUSEHOLD ELECTRIC FLAT BREAD MAKER AND SKILLET

[75] Inventors: Alan M. Garber; Timothy E. Covington, both of Richmond, Va.; Phillip L. Brookshire; David L. Slayton, both of Cincinnati, Ohio

[73] Assignee: Hamilton Beach/Proctor-Silex, Inc., Glen Allen, Va.

[21] Appl. No.: 09/255,116

[22] Filed: Feb. 22, 1999

[51] Int. Cl.$^7$ .............................. A47J 37/00; A47J 37/06; A47J 37/08
[52] U.S. Cl. .................................. 99/331; 99/339; 99/349; 99/353; 99/372; 99/379; 99/423; 219/521
[58] Field of Search ..................... 99/331, 349, 353–355, 99/426, 432, 372, 380, 422, 450.1, 483, 339, 379, 423; 100/92, 93.1; 425/136, 151, 160, 298, 324.1, 343, 293, 317, 394, 412, 383, 398; 426/496, 512; 219/524, 525, 521, 443

[56] References Cited

U.S. PATENT DOCUMENTS

| | | |
|---|---|---|
| 1,859,004 | 5/1932 | Reich . |
| 1,977,084 | 10/1934 | Person . |
| 2,317,225 | 4/1943 | Schara . |
| 2,602,131 | 7/1952 | Reich . |
| 3,610,885 | 10/1971 | Zingg . |
| 3,880,064 | 4/1975 | Martinez . |
| 4,011,431 | 3/1977 | Levin . |
| 4,487,116 | 12/1984 | Routhier ..................................... 99/339 |
| 4,559,002 | 12/1985 | Atwood . |
| 4,664,025 | 5/1987 | Martinez . |
| 4,838,153 | 6/1989 | Escamilla et al. ......................... 99/349 |
| 4,972,766 | 11/1990 | Anetsberger ............................... 99/332 |
| 4,987,827 | 1/1991 | Marquez . |
| 5,095,813 | 3/1992 | Escamilla et al. ..................... 99/353 X |
| 5,197,377 | 3/1993 | Jennings et al. ....................... 99/331 X |
| 5,341,727 | 8/1994 | Dickson .................................... 99/335 |
| 5,417,149 | 5/1995 | Raio et al. . |
| 5,473,976 | 12/1995 | Hermansson .......................... 99/379 X |
| 5,802,958 | 9/1998 | Heransson ................................ 99/349 |
| 5,890,419 | 4/1999 | Moravec ................................... 99/349 |

Primary Examiner—Timothy Simone
Attorney, Agent, or Firm—Roger S. Dybvig

[57] ABSTRACT

A household electric flat bread making appliance has a heated lower pressure plate fixed to a frame, an upwardly biased upper heated pressure plate pivotally mounted on the frame, and a heated skillet mounted on the frame in general vertical alignment with the pressure plates. A handle is connected to the upper pressure plate to enable the upper pressure plate to be manually pivoted downwardly toward the lower pressure plate to flatten a mass of dough between the two pressure plates. The handle is rotatable and has a generally circular arm with an eccentric upper surface for engaging an abutment that projects forwardly from the lower pressure plate in a position wherein the arm is engageable with the bottom surface of the abutment by rotation of the handle so that the handle may be rotated when the upper pressure plate is lowered toward the lower pressure plate to engage under the abutment and the handle may be released by the operator with the engagement of the abutment by the arm preventing the upper pressure plate from being pivoted upwardly. The handle can be disconnected and stored in a holster when the appliance is not in use. The skillet has sloping sides so that it may be used to heat fillings for a flat bread roll up.

24 Claims, 6 Drawing Sheets

HOUSEHOLD ELECTRIC FLAT BREAD MAKER AND SKILLET

FIELD OF THE INVENTION

This invention relates to a household electric flat bread maker and skillet.

BACKGROUND OF THE INVENTION

Popular food combinations made from flat bread have included crepes, tortillas and roll ups. All of these food combinations include a flat bread and various different fillings. Flat breads may be produced by rolling dough to a thin sheet and then cooking the flattened dough. Alternatively, a dough ball may be squeezed flat by pressing the ball under such high pressure that the ball is converted to a flat sheet of dough. U.S. Pat. No. 3,880,064 to M. N. Martinez and U.S. Pat. No. 4,664,025 to M. G. Martinez proposed household electrically-heated appliances for making tortillas provided with manually-operable mechanisms for squeezing balls of dough into flat sheets which are heated by the appliances. Both of these patents proposed to partially cook a flat sheet between the press plates used to squeeze the dough flat and thereafter complete the cooking of the flat sheet. The M. G. Martinez U.S. Pat. No. 4,664,025 tortilla maker also included a flat griddle plate located on top of the appliance for completing the cooking of a tortilla.

Considerable pressure must be exerted against the dough to flatten it into a flat sheet. The M. N. Martinez U.S. Pat. No. 3,880,064 relies on pivoted, manually-operated levers to exert the necessary pressure. The levers extend in front of the appliance housing. The user presses down on a lever which can cause the appliance to pivot about its lower front edge. This problem is recognized in the patent, which suggests that the appliance can be clamped to a counter or table top. This problem is avoided by the appliance disclosed in the M. G. Martinez U.S. Pat. No. 4,664,025 because the lower pressure plate is pivoted upwardly toward another pressure plate which is at an angle to horizontal. The lever mechanism disclosed in the M. G. Martinez U.S. Pat. No. 4,664,025, to pivot the lower plate upwardly is relatively complex and expensive. In addition, the mechanism is located generally in front of the appliance, which makes it awkward to use the appliance. There is also a possibility of a dough ball sliding down the lower press plate as it pivots upwardly at an angle to horizontal. Another problem encountered with the prior appliances is that they require a substantial amount of counter space to accommodate the lever systems employed by them.

Flat bread foods are becoming increasingly popular and there is need for a satisfactory, relatively inexpensive and compact flat bread maker which can be used to flatten a mass of dough and cook the flattened dough.

SUMMARY OF THE INVENTION

An object of this invention is to provide an electrically-heated flat bread making appliance which is easy to use, relatively compact when used and when prepared for storage, and relatively inexpensive.

A household electric flat bread making appliance in accordance with this invention includes a frame, a lower, electrically heated pressure plate affixed to the frame, an upwardly biased upper electrically heated pressure plate pivotally mounted at the back of the frame which may be manually lowered to flatten a mass of dough between the lower pressure plate and the upper pressure plate. A handle projects forwardly from the upper pressure plate in a position such that the operator of the appliance may press downwardly on the handle to pivot the upper pressure plate downwardly toward engagement with the lower pressure plate to squeeze a mass of dough between said pressure plates.

In another aspect of this invention, the handle is removable and can be stored for storage, preferably extending vertically, in a holster located at the rear of the appliance so that the handle is out of the way during storage.

In yet another aspect of this invention, an electrically heated skillet is mounted at the top of the appliance for use in preparing other foods, particularly ingredients which may be used as fillings for the flat bread. A skillet lid is also preferably provided for the skillet.

In still another aspect of this invention, the handle is rotatable and carries an arm adapted to engage under an abutment fixed to the lower pressure plate. The top surface of the arm is so shaped that the handle can be rotated to increase the pressure with which the upper and lower pressure plates are pressed toward one another. Therefore, the maximum pressures are applied to the dough by rotation of the handle, not by pressing downwardly on the handle, thereby avoiding the tendency of pivoting the appliance about its lower front edge.

As taught in the M. G. Martinez U.S. Pat. No. 4,664,025, a spatula which covers substantially the entire lower pressure plate is preferably used to support the dough while it is being flattened and cooked. In another aspect of this invention, recesses in a flange that extends upwardly from the lower pressure plate constitute guides for locating the spatula with its handle projecting out from one side or the other from the lower pressure plate so that the spatula handle will not interfere with the operation of the appliance.

Other objects and advantages will become apparent from the following description and the accompanying drawings.

DETAILED DESCRIPTION

Figure 1:
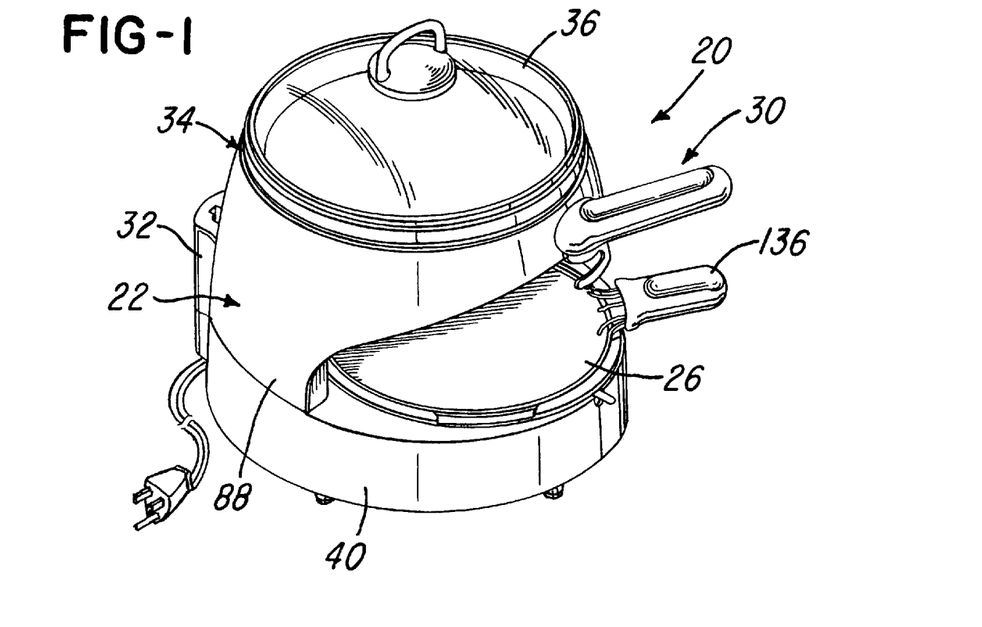
FIG. 1 is a perspective view of a flat bread making appliance in accordance with this invention showing the upper pressure plate in its raised position.
Figure 2:
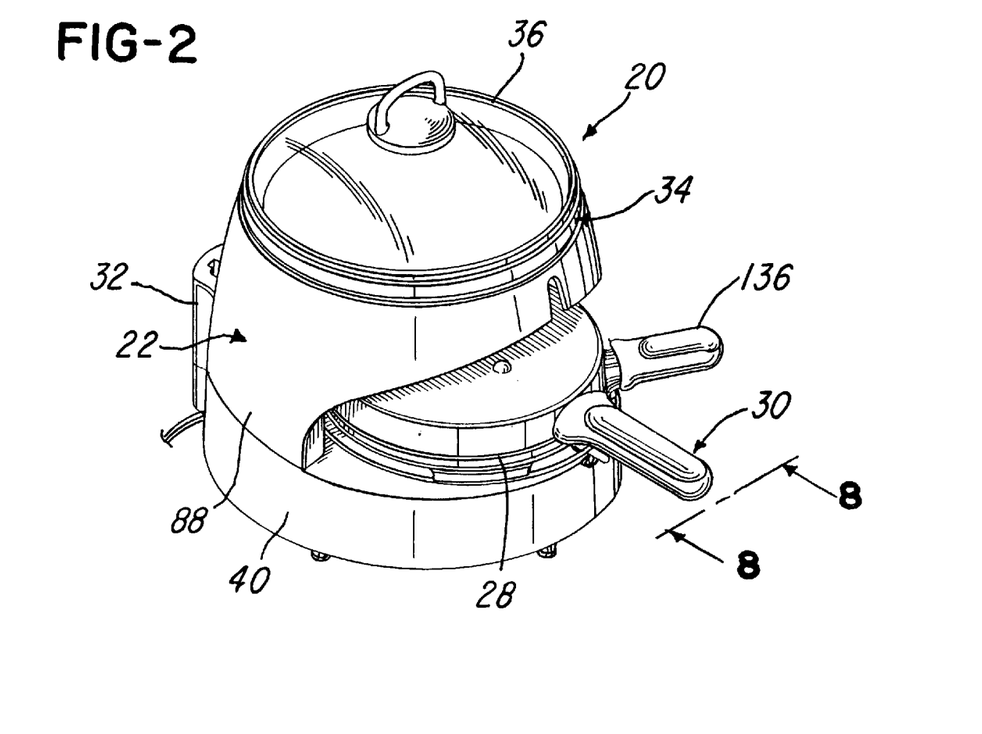
FIG. 2 is a perspective view similar to FIG. 1 showing the upper pressure plate lowered onto the spatula which covers the lower pressure plate.
Figure 3:
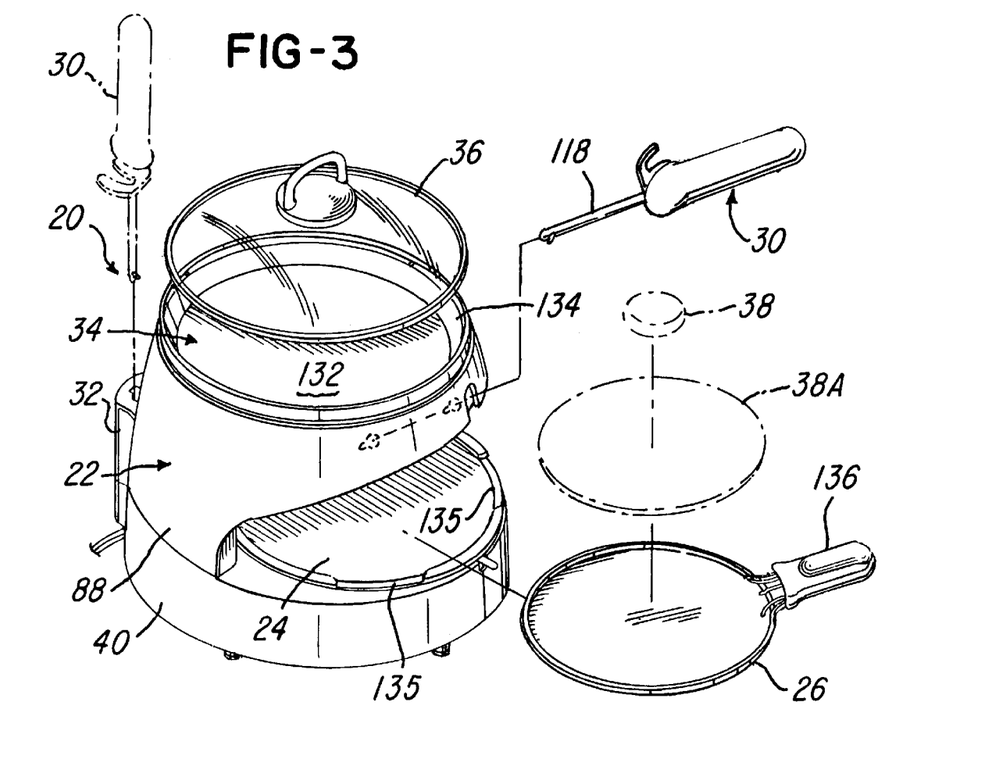
FIG. 3 is a partially exploded diagrammatic and perspective view of the appliance of FIG. 1.

With reference to FIGS. 1 through 4, a flat bread making appliance in accordance with this invention is generally designated 20 and comprises a housing, generally designated 22, a lower pressure plate 24 fixed in the housing 22, a spatula 26 removably supported by the lower pressure plate 24, an upper pressure plate 28 (FIG. 2) which is pivotally mounted in the housing 22, a handle 30 removably connected to the upper pressure plate 28, a holster 32 for storing the handle 30 when not in use as indicated by phantom lines in FIG. 3, a skillet 34 at the top of the housing 22, and a skillet lid 36 for covering the skillet 34.

FIG. 3 also shows by phantom lines a ball of dough 38 which is flattened into a thin sheet of flat bread 38A by operation of the appliance 20.

Figure 5:
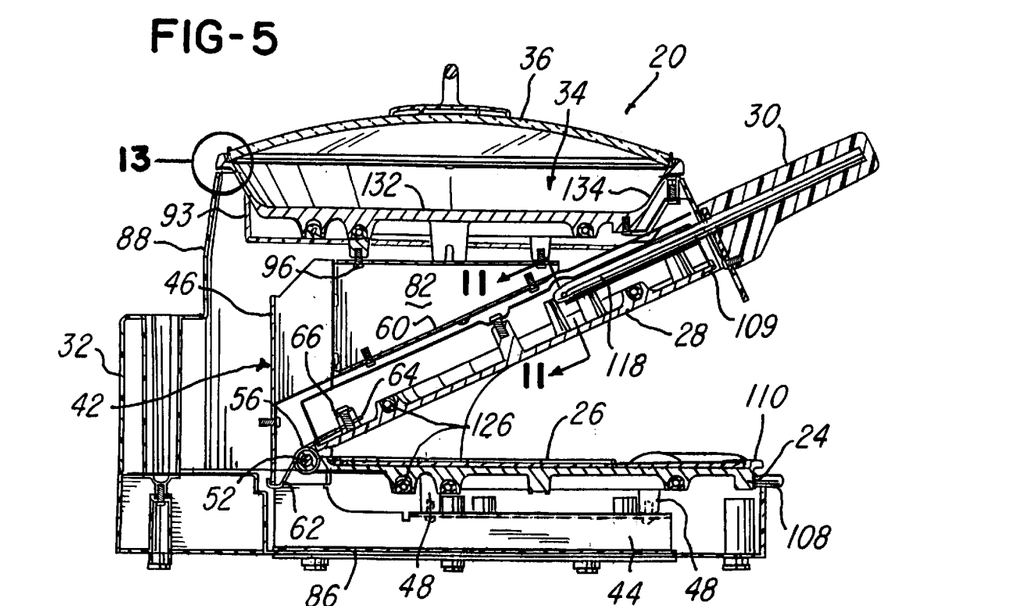
FIG. 5 is a vertical cross-sectional view of the appliance with the upper pressure plate shown in its raised orientation.
Figure 6:
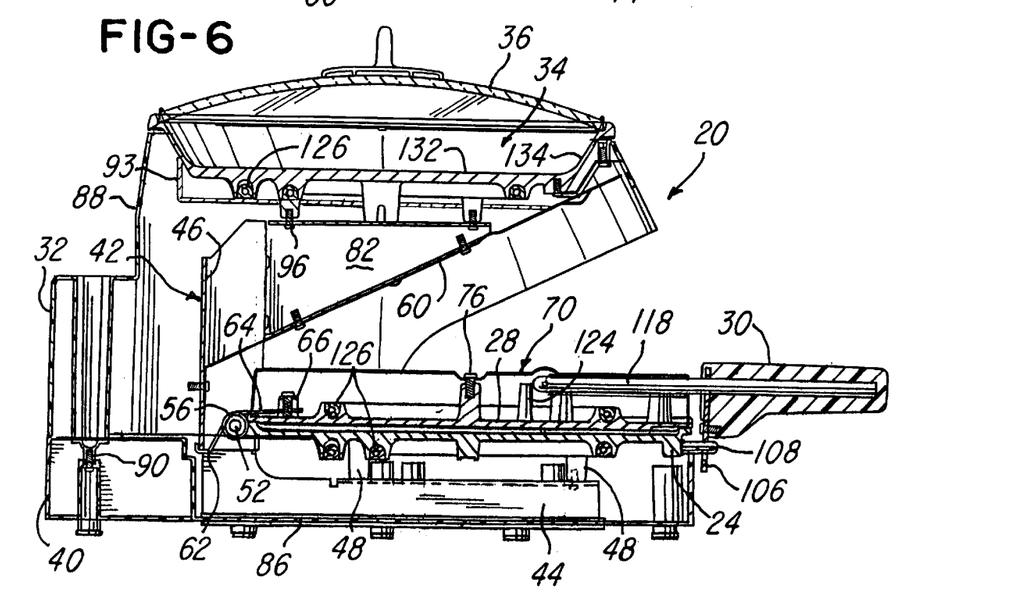
FIG. 6 is a vertical cross-sectional view similar to FIG. 5 but showing the upper pressure plate lowered onto the lower pressure plate.
Figure 7:
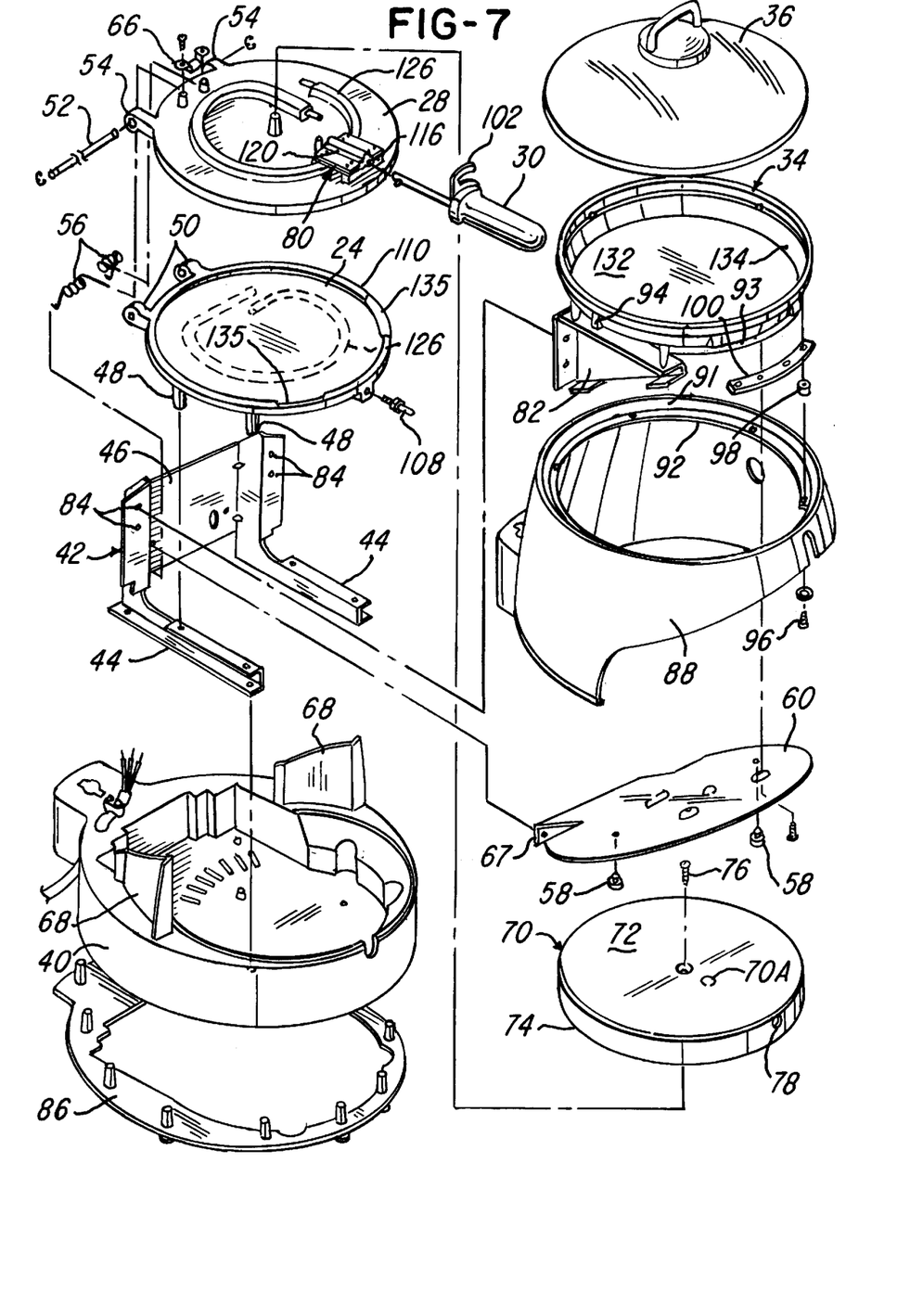
FIG. 7 is an exploded perspective view of the appliance shown without the spatula.

With reference to FIGS. 5 through 7, the housing 22 includes a lower housing 40 which houses a main frame 42 that includes longitudinally-extending rails 44 and a vertical frame plate 46 at the back of the appliance 20. The lower pressure plate 24 has feet 48 connected to the rails 44 and rearwardly-extending apertured ears 50 that rotatably receive a pivot pin 52 that extends transversely to the rear of the housing 22. Apertured ears 54 at the rear of the upper pressure plate 28 also rotatably receive the pivot pin 52. A pair of coil springs 56 wrapped around the pivot pin 52 bias the upper pressure plate 28 upwardly or in a counterclockwise direction as viewed in FIGS. 5 and 6 against a pair of elastomeric stops or bumpers 58 mounted on a metal shield 60 which is held in a slanted position that is generally parallel to the upper pressure plate 28 in its upper position. For this purpose, one end 62 of each coil spring 56 is trapped under the bottom of the vertical frame plate 46 and its other end 64 is trapped under a strap 66 mounted on the top of the upper pressure plate 28. The slanting shield 60 has a downwardly-extending panel 67 (FIG. 7) at its rearward end which is connected by screws to the vertical frame plate 46. The slanting shield 60 is also connected by screws to posts depending from the bottom of the skillet 34 and has its sides supported by plastic support plates 68 projecting upwardly from the lower housing 40. The slanting shield 60 is primarily intended to prevent access to the adjustable thermostat and other electrical components under the skillet 34 without disassembly of the appliance 20.

A hollow cylindrical cover member, generally designated 70, comprising a top plate 72 and a depending cylindrical skirt 74 is affixed on top of the upper pressure plate 28 by a screw 76. A keyhole opening 78 is located in front of the cover member skirt 74 in alignment with a handle support assembly 80 affixed to the top of the upper pressure plate 28, as will be further described below.

Figure 13:
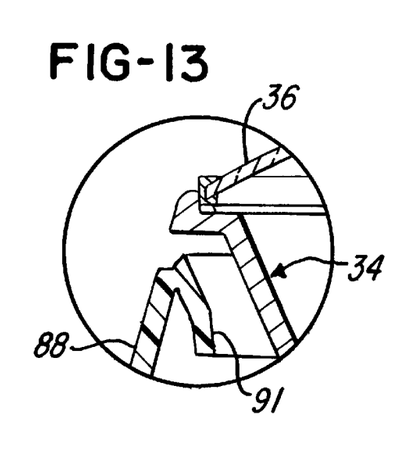
FIG. 13 is an enlarged cross-sectional view of the portion of the housing, the skillet and the skillet lid included within view line 13 of FIG. 5.

The skillet 34 is mounted by a pair of support brackets 82 onto the main frame plate 46 utilizing four tapped holes 84 that extend through the vertical frame plate 46 shown in FIG. 7. In addition to the lower housing 40, the housing 22 also includes a lower housing cover plate 86 and a hollow, tubular upper housing 88 that extends from the top of the lower housing 40 to the outer rim of the skillet 34. The upper housing 88 is connected to the lower housing 40 and the lower housing cover plate 86 by a screw 90 (FIGS. 5 and 6). As best shown in FIG. 13, the outer margin of the skillet 34 may extend slightly above the top of the upper housing 88 to reduce the high temperatures which the upper part of the upper housing 88 would otherwise experience. As best shown in FIG. 7, the top of the upper housing 88 is provided with a depending internal skirt 91 and an internal ledge 92 at the bottom of the skirt 91 which is connected to plural pads 94 cast integrally with the skillet 34 and having downwardly open tapped holes (not shown) that receive mounting screws 96. Spacers 98 made from insulating materials may be used to reduce the heat conducted to the plastic material by the skillet 34. In addition, to avoid the plastic forming the ledge 92 from being exposed to excessive heating at the front of the upper housing 88, part of the ledge 92 can be omitted and replaced by a stainless steel strap 100 (FIG. 7) which has outer holes for connection by screws (not shown) to spaced parts of the ledge 92 and inside holes for connection to the skillet 34 by other screws (not shown). Further to avoid overheating of the front of the upper housing 88, the height of the internal skirt 91 at the front of the upper housing 88 may be reduced and its inside surface covered by aluminum foil tape (not shown) which reflects heat radiated from the skillet 34 away from the plastic parts covered by the foil tape. In addition, a metal heat shield 93, which is similar to the cover 70 for the upper pressure plate 28, may be used to cover parts of the bottom surface of the skillet 34.

Figure 8:
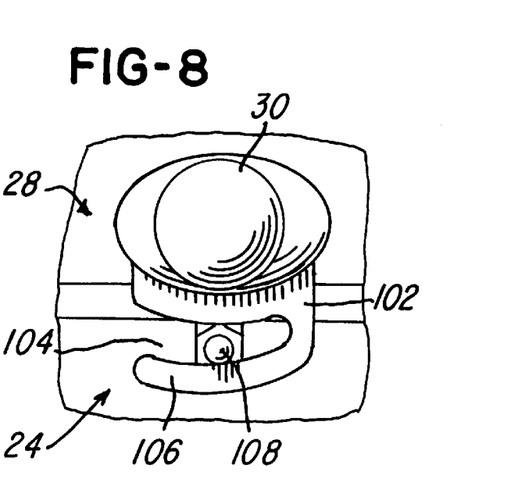
FIG. 8 is an enlarged fragmentary front elevational view showing the handle and a portion of the housing and pressure plates and showing the handle positioned to hold the upper and lower pressure plates together.
Figure 9:
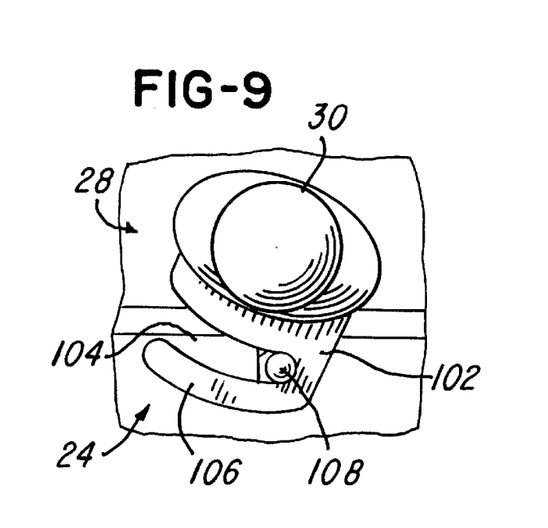
FIG. 9 is a view similar to FIG. 8 but showing the handle rotated to a greater degree than FIG. 8.

In operation of the appliance, a dough ball 38 is placed on the spatula 26 and the spatula 26 placed on the lower pressure plate 24 inside an upstanding flange 110 that forms the margin of the lower pressure plate 24. The handle 30 is then used to pull the upper pressure plate 28 downwardly toward the lower pressure plate 24, causing the dough ball to be squeezed. With reference to FIGS. 8 and 9, in accordance with this invention, the handle 30 is rotatably mounted on the upper pressure plate 28 and a cam plate 102 is fixedly mounted on the handle 30. The cam plate 102 includes a cam slot 104 bounded by a cam arm 106 that, by rotation of the handle 30, engages under an abutment pin 108 screwed into the lower pressure plate 24. The distance from the top surface of the cam arm 106 to the axis of rotation of the handle 30 decreases from the free end of the cam arm 30 to the inner end of the cam slot 104. Accordingly, as the handle 30 is rotated in a clockwise direction as viewed in FIGS. 8 and 9, the upper and lower pressure plates 24 and 28 are drawn progressively closer together. Accordingly, the maximum pressure is applied to the pressure plates 24 and 28 by the rotational motion of the handle 30 rather than by pushing downwardly on the handle 30. The downward movement of the upper pressure plate 28 is limited by the engagement of its outer margin 109 with the marginal flange 110 of the lower pressure plate 24. The outer margin 109 of the upper pressure plate 28 is preferably raised slightly relative to the rest of the lower surface of the upper pressure plate 28. Accordingly, a flat bread squeezed to the point that the margins 109 and 110 of the pressure plates engage one another would be exceedingly thin.

Figure 10:
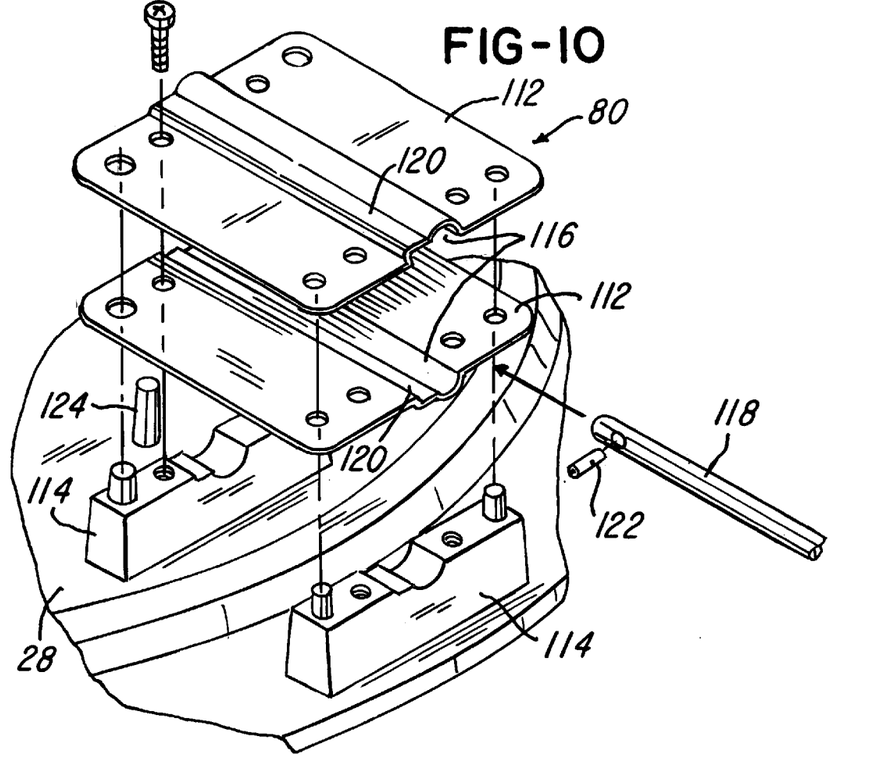
FIG. 10 is a fragmentary perspective view of a portion of the upper pressure plate and a handle support assembly mounted thereon and also showing a fragment of the stem of the handle and a key mounted on the stem.
Figure 11:
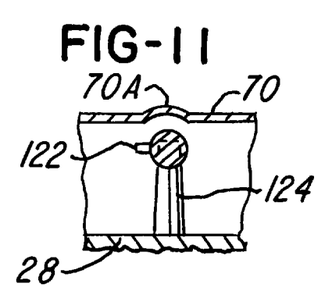
FIGS. 11 and 12 are fragmentary cross-sectional views taken along section line 11—11 of FIG. 5 and illustrating the relationship between the key mounted on the handle stem and a cover for the upper pressure plate.
Figure 12:
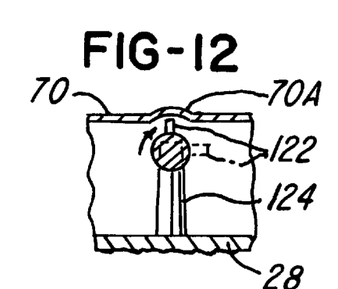

FIGS. 10 through 12 illustrate the handle support assembly 80 for rotatably supporting the handle 30 on the upper pressure plate 28. Support assembly 80 comprises a pair of support plates 112 abutted face-to-face with one another and connected to a pair of support pads 114 integrally cast on top of the upper pressure plate 28. The support plates 112 have mutually confronting surfaces defining a bore 116 adapted to receive a stem 118 of the handle 30 and further define a keyway 120 extending along a side of the bore 116. The handle stem 118 has a key 122 that can consist of a spring roll pin that is adapted to pass through the keyway 120 when the handle stem 118 is extended through the bore 116. To connect the handle 30 to the upper pressure plate 28, the free end of the handle stem 118 is extended sufficiently far past the inner ends of the support plates 112 that the key 122 also extends past the inner end of the keyway 120. The handle 30 can then be rotated whereupon the key 122 moves out of alignment with the keyway 120. Engagement between the key 122 and the innermost ends of the support plates 112 would prevent the handle 30 from being retracted from the handle support assembly 80 unless the handle 30 is so rotated that the key 122 is again aligned with the keyway 120. The natural balance of the handle 30 is such that the cam plate 102 extends downwardly to a position which is about 180° opposite the position of the handle 30 in which the key 122 is aligned with the keyway 120 so that accidental alignment of the key 122 with the keyway 120 is unlikely. FIGS. 11 and 12 illustrate changing positions of the key 122 when it moves out of alignment with the keyway 120. The cover 70 is shown to have a raised portion 70A so that the movements of the key 122 are not prevented by engagement with the cover 70.

A post 124 aligned with the bore 116 extending upwardly from the upper surface of the upper pressure plate 28 serves as a stop that limits the extent to which the free end of the handle stem 118 can be inserted past the inner ends of the support plates 112. The holster 32 has a bore and two keyways to receive the handle stem 118 and the key 122 so that the handle 30 can be held by the holster 32 in a vertical position.

Figure 4:
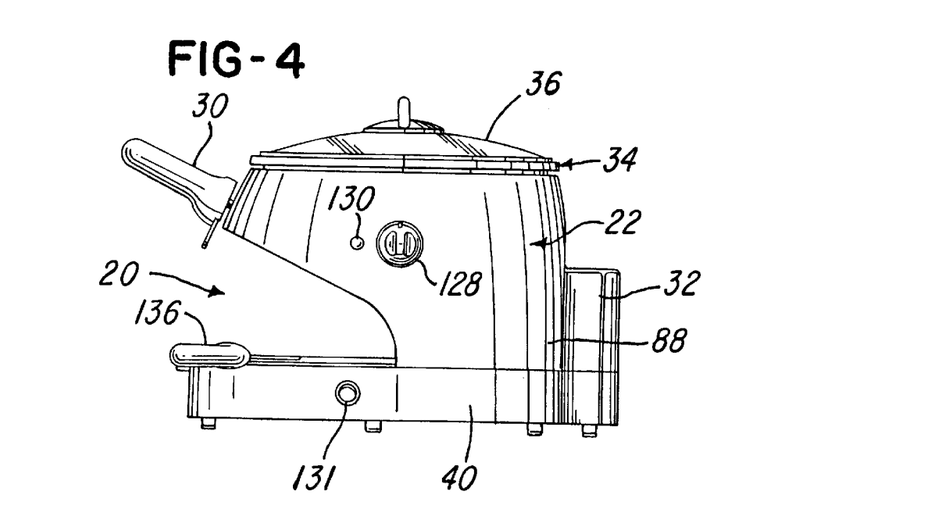
FIG. 4 is a side elevational view of the appliance of FIG. 1.

The three heating units, the lower pressure plate 24, the upper pressure plate 28 and the skillet 34, are each heated by calrod heating elements 126. The electrical circuitry for controlling the heating elements 126 can be essentially conventional. However, the heating element 126 for the skillet is preferably controlled by an adjustable thermostat (not shown) underneath the skillet 34 and having a control rod (not shown) rotatable by a control knob 128 (FIG. 4). Operation of the skillet heating element 126 is indicated by a neon or the like bulb 130. Electrical energy can be supplied to the heating elements by operation of a power switch 131. The heating elements 126 for the two pressure plates 24 and 28 are controlled by preset, high-temperature limiting thermostats, one for each pressure plate, which may have the same or different high temperature limits.

The skillet 34 has a recessed bottom surface 132 and a downwardly and inwardly sloping wall 134 so that it may be used to prepare sauces or other fillings for flat breads cooked by the appliance 20.

It will be noted that the marginal flange 110 of the lower pressure plate 24 has two recesses 135 on opposite sides of the longitudinal center line of the appliance. These recess are adapted to receive the spatula handle, designated 136, and thereby keep the spatula handle away from the longitudinal centerline which could lead to interference with the lowering of the upper pressure plate 28.

Although the presently preferred embodiment of this invention has been described, it will be understood that within the purview of the invention various changes may be made within the scope of the following claims.

Having thus described our invention, we claim:

1. A household electric flat bread making appliance comprising a frame, a heated lower pressure plate affixed to said frame, an upwardly biased upper heated pressure plate pivotally mounted at the back of the frame about a pivot axis with respect to said frame for flattening a mass of dough between said lower pressure plate and said upper pressure plate, a handle connected to said upper pressure plate, said handle projecting forwardly from the front end of said upper pressure plate in a position in which the handle may be manually lowered to pivot said upper pressure plate downwardly toward engagement with said lower pressure plate to squeeze a mass of dough between said pressure plates, and an electrically-heated skillet mounted on said frame in generally vertical alignment with said pressure plates.

2. The appliance of claim 1 further including a skillet lid for covering the top of the skillet.

3. The appliance of claim 1 further comprising an adjustable thermostat for controlling the temperature of said skillet.

4. The appliance of claim 1 wherein said handle is rotatable about an axis that lies in a vertical plane that extends through the center of said upper pressure plate and has an arm that extends generally circularly around said axis, said arm having an upper surface portion spaced outwardly from said handle, wherein an abutment projects forwardly from said lower pressure plate in a position wherein said arm is engageable with the bottom surface of said abutment by rotation of said handle so that said handle may be rotated when the upper pressure plate is lowered toward said lower pressure plate to engage under said abutment and the handle may be released by the operator with the engagement of the abutment by the arm preventing the upper pressure plate from being pivoted upwardly.

5. The appliance of claim 1 wherein said upper surface of said arm is eccentric relative to said axis of rotation of said arm so that greater pressure is applied to said pressure plates tending to draw said pressure plates toward one another upon further rotation of said handle to draw said upper pressure plate and said lower pressure plate toward-one another.

6. An electric flat bread making appliance comprising a frame, a pair of mutually cooperating and heated pressure plates mounted for relative movement toward one another to squeeze a mass of dough therebetween, and a heated skillet mounted on said frame, said skillet having sloping sides so that it may be used to heat fillings for a flat bread roll up.

7. The appliance of claim 6 further comprising a lid for closing the top of said skillet.

8. The appliance of claim 6 wherein said pressure plates include a lower pressure plate immovably fixed to said frame and an upper pressure plate pivotally mounted about a horizontal axis extending transversely through the back of said appliance and biased upwardly out of engagement with said lower pressure plate.

9. The appliance of claim 8 further comprising a handle connected to said upper pressure plate by which an operator may press the upper pressure plate downwardly.

10. The appliance of claim 9 wherein said handle is rotatable about an axis that lies in a plane that extends generally centrally through said upper pressure plate.

11. The appliance of claim 10 wherein an abutment is located adjacent to said lower pressure plate and fixed in relation to said pressure plate and wherein a clamping plate is mounted on said handle, said clamping plate having an arm spaced from the body of said handle having an upper surface adapted to engage the underside of said abutment by rotation of said handle to hold said pressure plates pressed toward one another.

12. The appliance of claim 10 wherein said handle can be disconnected from said upper pressure plate, and wherein said appliance is provided with a holster for said handle when the appliance is not in use.

13. An electric flat bread making appliance comprising a frame, a pair of mutually cooperating and heated pressure plates mounted for relative movement toward one another to squeeze a mass of dough therebetween, said pressure plates including a lower pressure plate immovably fixed to said frame and an upper pressure plate pivotally mounted about a horizontal axis extending transversely through the back of said appliance and biased upwardly out of engagement with said lower pressure plate, a handle connected to said upper pressure plate with which an operator may press the upper pressure plate downwardly, said handle being removable from said upper pressure plate, and a holster for storing said handle when the appliance is not in use.

14. The appliance of claim 13 wherein said handle is rotatable about an axis that lies in a plane that extends generally centrally through said upper pressure plate.

15. The appliance of claim 13 wherein an abutment is located adjacent to said lower pressure plate and fixed in relation to said pressure plate and wherein a clamping plate is mounted on said handle, said clamping plate having an arm spaced from the body of said handle having an upper surface adapted to engage the underside of said abutment by rotation of said handle to hold said pressure plates pressed toward one another.

16. The appliance of claim 13 wherein said holster extends vertically along the back of said appliance and has a vertical bore for holding said handle in a vertical orientation.

17. The appliance of claim 13 wherein said handle has an elongate stem and a key projecting outwardly from the free end of said stem.

18. The appliance of claim 17 wherein a handle support is mounted on said upper pressure plate, said handle support having a bore for receiving said stem and a keyway extending alongside said bore for receiving said key.

19. The appliance of claim 18 wherein said handle support is sufficiently short that said handle stem may be inserted through the bore with said stem extending past said support, whereupon said handle may be rotated so that said key is not aligned with said keyway to retain said handle stem within said bore.

20. The appliance of claim 19 wherein said support comprises a pair of plates abutted face-to-face with one another and mounted on support pads on the upper surface of said upper pressure plate, said plates having mutually confronting surfaces defining said bore and said keyway.

21. An electric flat bread making appliance comprising a frame, a pair of mutually cooperating and heated pressure plates mounted for relative movement toward one another to squeeze a mass of dough therebetween, said pressure plates including a lower pressure plate immovably fixed to said frame and an upper pressure plate pivotally mounted about a horizontal axis extending transversely through the back of said appliance and biased upwardly out of engagement with said lower pressure plate, an abutment located adjacent to said lower pressure plate and fixed in relation to said lower pressure plate, a handle connected to said upper pressure plate with which an operator may press the upper pressure plate downwardly, said handle being rotatable about an axis that lies in a plane that extends generally centrally through said upper pressure plate, and a clamping plate mounted on said handle, said clamping plate having an arm spaced from the body of said handle and having an upper surface adapted to engage the underside of said abutment by rotation of said handle to hold said pressure plates pressed toward one another.

22. The appliance of claim 21 wherein said handle is rotatable about an axis that lies in a plane that extends generally centrally through said upper pressure plate.

23. The appliance of claim 22 wherein said handle has an arm that extends generally circularly around said axis, said arm having an upper surface portion spaced outwardly from said handle, wherein an abutment projects forwardly from said lower pressure plate in a position wherein said arm is engageable with the bottom surface of said abutment by rotation of said handle so that said handle may be rotated when the upper pressure plate is lowered toward said lower pressure plate to engage under said abutment and the handle may be released by the operator with the engagement of the abutment by the arm preventing the upper pressure plate from being pivoted upwardly.

24. The appliance of claim 23 wherein said upper surface of said arm is eccentric relative to said axis of rotation of said arm so that greater pressure is applied to said pressure plates tending to draw said pressure plates toward one another upon further rotation of said handle to draw said upper pressure plate and said lower pressure plate toward one another.

* * * * *